Patented June 2, 1936

2,042,960

UNITED STATES PATENT OFFICE 2,042,960

HARD RUBBER DUST

Francis Norman Pickett, Westminster, London, England, assignor to United States Rubber Products, Inc., New York, N. Y., a corporation of Delaware No Drawing. Application October 10, 1935, Serial No. 44,393. In Great Britain August 23, 1934

6 Claims. (Cl. 18—53)

This invention relates to an improved process for making hard rubber dust, and more particularly to a process for manufacturing hard rubber dust or powder direct from aqueous dispersions of rubber, such as rubber latex.

The invention consists broadly in compounding an aqueous dispersion of rubber with sufficient vulcanizing agent to produce a hard rubber vulcanizate, spray drying the compounded dispersion to produce a substantially dried and partly vulcanized light, porous sponge, and vulcanizing the sponge to a friable hard rubber coke-like mass, which can easily be disintegrated to hard rubber dust.

As a specific example of the process, without intention of limiting the invention thereof, a rubber latex of suitable concentration, with or without previous treatment such as chemical creaming, centrifuging, evaporating, stabilizing, or the addition of compounding or filler ingredients, is mixed with from 30 to 100 parts of sulphur per 100 parts of solids of the rubber latex. The sulphur in finely divided form is preferably mixed into an aqueous paste with a stabilizing material such as soap, glue, alkali salt of casein, sulphonated castor oil, or the trade product known as Nekal which is a sulphonated condensation product of an aromatic hydrocarbon and an aliphatic alcohol. Colloidal sulphur may be used in which case little or no additional stabilizer is needed to prevent coagulation of the latex on addition of the sulphur. In many cases, so-called colloidal sulphur has accompanying it a sufficient proportion of stabilizer by virtue of the process of preparation of the colloidal sulphur. The mixture of sulphur and latex, preferably without any prolonged prior heat treatment, is spray dried in any of the usual forms of apparatus for spray drying latex or other liquids, as exemplified by the spray drying apparatus disclosed in the patent of Bradley and Coffin No. 1,428,526 and patent to Coffin No. 1,534,030. The spray drying of the latex and sulphur mixture produces a substantially dried and partly vulcanized rubber product which deposits on the walls and bottom of the drier in the form of a light, porous coating, the particles of which, though free from water, may be somewhat tacky. Continued operation of the spray drier produces an ivory coloured, light, porous sponge which can be easily swept off the sides of the chamber and collected at the bottom. Care should be exercised at this stage to avoid subjecting this light spongy mass to any appreciable mechanical pressure, since if it is squeezed, it may set into an exceedingly tough and strong semi-vulcanized mass, and the product of the final coke-like product will be too dense to permit easy disintegration of the same to light dust. The light, spongy mass thus collected is cured to a hard rubber product which has the appearance of light brown coke and is of an extremely friable nature. This completion of the vulcanization of the light, spongy mass may take place in closed receptacles in an open steam cure. With a latex and sulphur composition, free from zinc oxide or other accelerators, ten hours under an open steam cure at 60 lbs. per square inch steam pressure will be sufficient to produce a hard rubber vulcanizate. This light brown, coke-like, hard rubber product is so light and friable that it may be reduced to a dust of great fineness in an ordinary disintegrator, roll grinding not being necessary, although of course it may be used if desired.

Instead of using a natural latex, an artificial dispersion of raw or reclaimed rubber may be similarly compounded with 30 to 100 parts of sulphur, for example, and the mixture spray dried and the partially vulcanized product cured to a light friable, coke-like product as above described. In producing a hard rubber dust by the present process utilizing rubber and sulphur only, with the addition of stabilizing materials if desired, the time of curing is somewhat protracted as shown in the above example, but this may be reduced by suitably compounding the dispersion containing sulphur with zinc oxide and/or other accelerators as well-known in the latex art. Zinc oxide, however, is in many cases not desired in the hard rubber dust. A partial curing of the latex mixture may take place prior to the spray drying operation, as for example in heating the mixture before spraying, but complete curing of the rubber to a hard rubber vulcanizate does not take place, according to the present invention, until after the dried and partially vulcanized spray dried product has been cured to the friable, coke-like product.

It is obvious that numerous modifications may be apparent to persons skilled in the art and it is not desired to limit the invention otherwise than as set forth in the appended claims.

Having thus described my invention, what I claim and desire to protect by Letters Patent is:

1. A method of manufacturing hard rubber dust consisting in spray drying an aqueous dispersion of rubber containing sufficient vulcanizing agents to produce a hard rubber vulcanizate, curing the sprayed product to hard rubber while avoiding subjecting it to any mechanical pressure, and reducing the cured rubber to dust.

2. A method of manufacturing hard rubber in the form of dust or powder direct from rubber latex consisting in adding sulphur to latex in the presence of a stabilizer, spray drying the compounded latex, curing the sprayed product to hard rubber while avoiding subjecting it to any mechanical pressure and reducing the cured rubber to dust.

3. A method of manufacturing hard rubber in the form of dust or powder direct from rubber latex consisting in adding sulphur to latex in the presence of a stabilizer in the proportion of at least 30% of the dry rubber content, spray drying the compounded latex, curing the sprayed product to hard rubber while avoiding subjecting it to any mechanical pressure and reducing the cured rubber to dust.

4. A method of manufacturing hard rubber in the form of dust or powder direct from rubber latex consisting in adding sulphur to latex in the presence of a stabilizer, spray drying the compounded latex, while maintaining the sulphur in a state of intimate mixture with the latex, curing the sprayed product to hard rubber while avoiding subjecting it to any mechanical pressure and reducing the cured rubber to dust.

5. A method of manufacturing hard rubber in the form of dust or powder direct from rubber latex consisting in adding sulphur to latex in the presence of a stabilizer, spray drying the compounded latex while maintaining the sulphur in a state of intimate mixture with the latex, adding accelerators, curing the sprayed product to hard rubber while avoiding subjecting it to any mechanical pressure and reducing the cured rubber to dust in a disintegrator.

6. A method of manufacturing hard rubber in the form of dust or powder direct from rubber latex consisting in adding sulphur to latex in the presence of a stabilizer, spray drying the compounded latex while maintaining the sulphur in a state of intimate mixture with the latex, adding zinc oxide, curing the sprayed product to hard rubber while avoiding subjecting it to any mechanical pressure and reducing the cured rubber to dust in a disintegrator.

FRANCIS NORMAN PICKETT.